April 12, 1927.　　　　　B. A. STAMP　　　　　1,624,517
POULTRY CRATE
Filed March 28, 1925　　　3 Sheets-Sheet 3

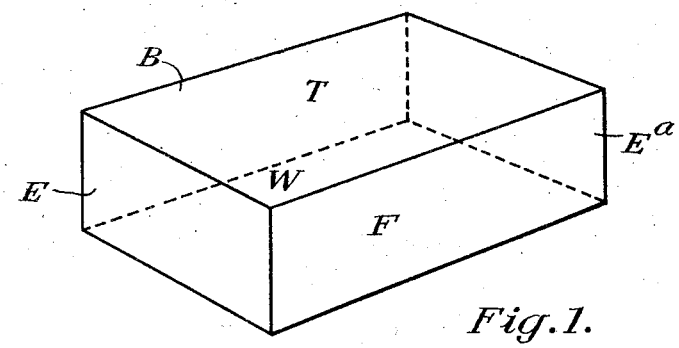
Fig.1.
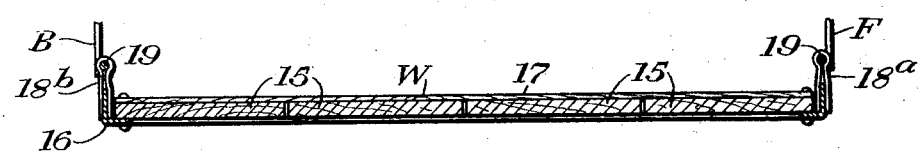
Fig.2.
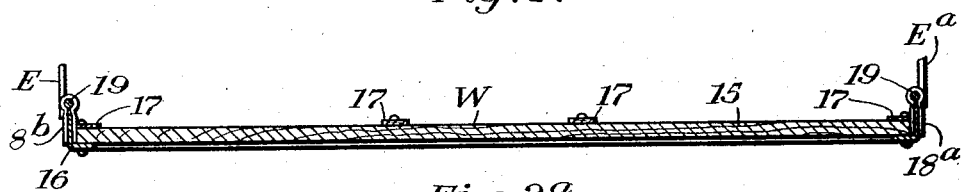
Fig.2.ª
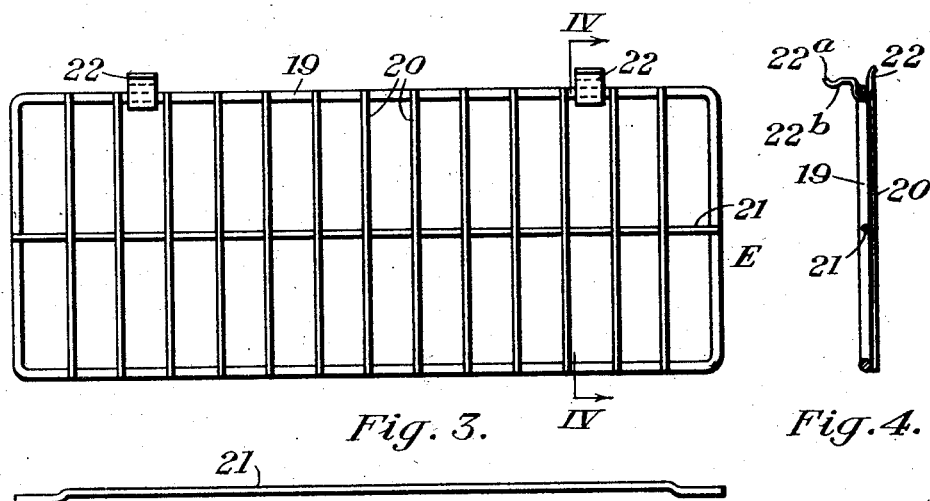
Fig.3.   Fig.4.
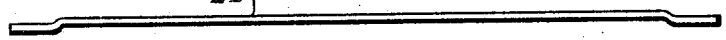
Fig.5.

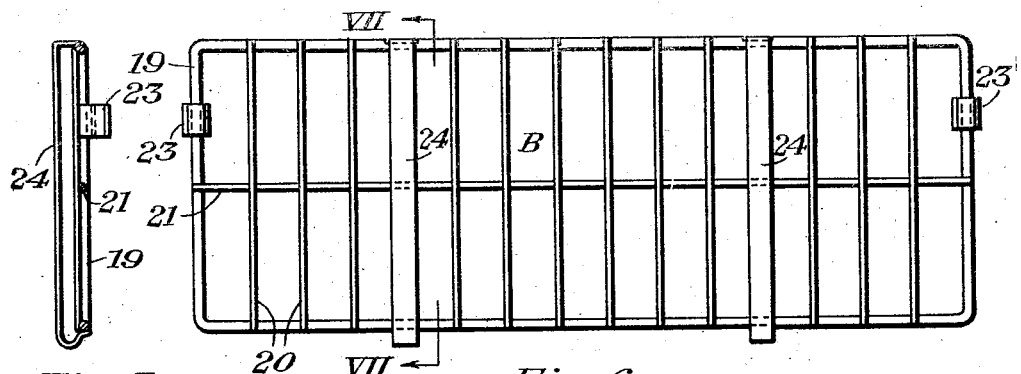
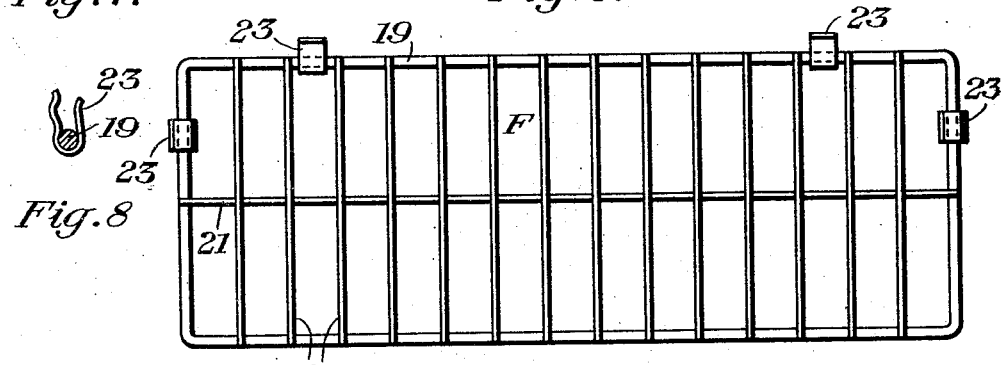
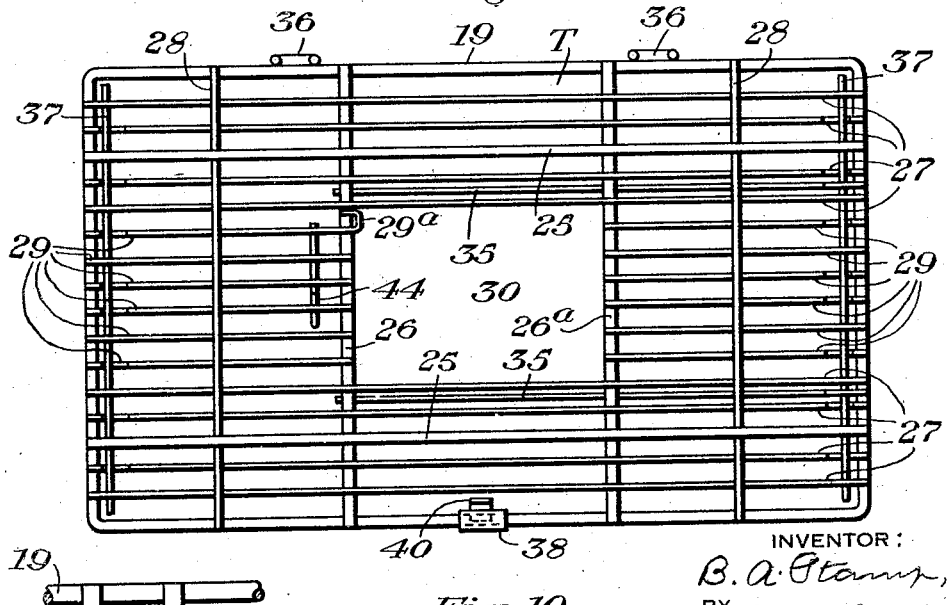

INVENTOR:
B. A. Stamp,
BY *A. R. Vencill*
*His* ATTORNEY

Patented Apr. 12, 1927.

1,624,517

UNITED STATES PATENT OFFICE.

BURNIE A. STAMP, OF BROOKLYN, NEW YORK, ASSIGNOR, BY MESNE ASSIGNMENTS, TO STAMP RIGHTWAY CONVEYOR COMPANY, OF BROOKLYN, NEW YORK, A CORPORATION OF DELAWARE.

POULTRY CRATE.

Application filed March 28, 1925. Serial No. 19,067.

My invention relates to collapsible crates for shipping live poultry, and has for an object the provision of an improved crate of this type.

I will describe one form of crate embodying my invention, and will then point out the novel features thereof in claims.

Figure 11:
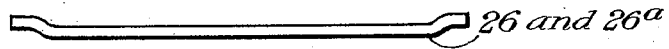
Figure 12:
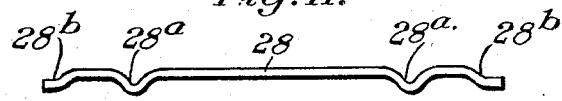
Figure 13:
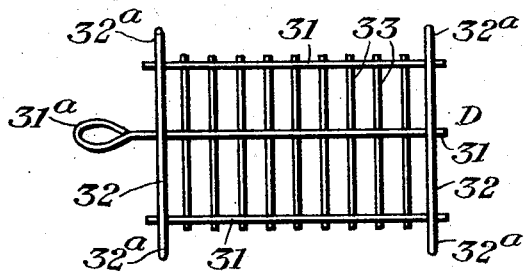
Figure 14:
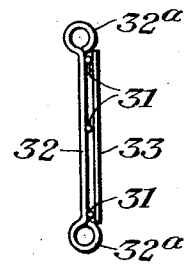
Figure 15:
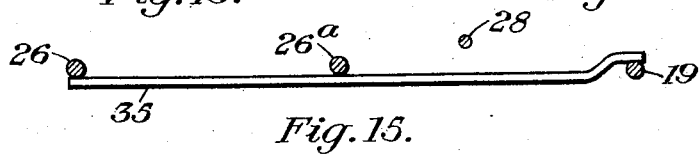
Figure 16:
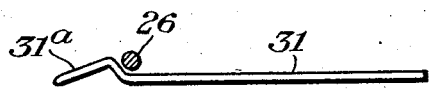
Figure 17:
Figure 18:
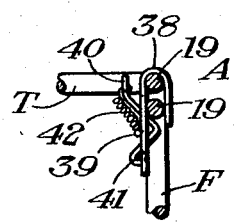
Figure 19:
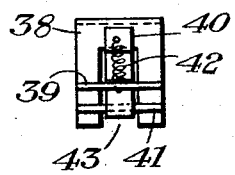
Figure 20:

In the accompanying drawings, Fig. 1 is a perspective view showing one form of crate embodying my invention. Fig. 2 is a transverse sectional view of the bottom member W of the crate. Fig. 2ᵃ is a longitudinal sectional view of the bottom member W. Fig. 3 is a view showing in front elevation one of the end members E of the crate. Fig. 4 is a sectional view of the end members on the line IV—IV of Fig. 3. Fig. 5 is a view showing the shape of one of the wires 21 in the end member E. Fig. 6 is a view showing in front elevation the back member B of the crate shown in Fig. 1. Fig. 7 is an end view of the back member B. Fig. 8 is a view showing a spring clip 23 attached to the back member B. Fig. 9 is a view showing in front elevation the front member F of the crate. Fig. 10 is a plan view of the top member T of the crate. Fig. 10ᵃ is a fragmental view showing the hinge loops 36 attached to the top member. Fig. 11 is a view showing the shape of wires 26 and 26ᵃ in the top member, and Fig. 12 is a view showing the shape of wires 28 in the top member. Fig. 13 is a plan view showing a door D for the top member, and Fig. 14 is an end view of this door. Figs. 15, 16 and 17 are detail views showing the shapes of wires 35, 31 and 27 in the top member T. Fig. 18 is a side view of a spring latch A for keeping the crate closed, and Fig. 19 is a rear view of the latch A. Fig. 20 is a detail view showing a hook for latching the top and back members together while the crate is being folded.

Similar reference characters refer to similar parts in each of the several views.

Referring first to Fig. 1 of the drawings, the crate comprises a bottom W, two end members E and Eᵃ, a back member B, a front member F, and a top member T.

The bottom W of the crate is made of wood, and preferably comprises (see Figs. 2 and 2ᵃ) a plurality of boards 15 held together by a number of cleats 17 and also by an angle iron 16 which entirely surrounds the outer edge of the wooden bottom and is butt-welded at the point where its two ends join. This angle iron 16 supports a plurality of hinges 18 to which the end members, back members and front members are pivoted. Each hinge is a piece of strip steel bent back on itself to form a loop and welded to the vertical part of the angle iron 16.

The two end members E and Eᵃ are alike, and a description of one will suffice. Referring to Fig. 3, the end member E comprises a frame made of a relatively heavy wire 19 bent into the form of a rectangle and butt-welded where its ends meet. The upper and lower horizontal sides of this frame are connected by a plurality of equally spaced relatively light wires 20 the ends of which are welded to the rectangle. A horizontal wire 21 extends between the two vertical sides of the frame and is welded to the frame and also to each vertical wire 20. Each vertical wire 20 is straight and lies on the outside of the frame 19. Each end of the horizontal wire 21 also lies on the outside of the frame 19 but this wire is offset near each end, as shown in Fig. 5 which is a top view of the wire 21, so that it passes on the inside of each of the vertical wires 20.

The upper side of the frame 19 of each end member carries two spring clips 22 for coaction with the top member T as hereinafter explained.

Referring now to Figs. 6, 7 and 8, the back member B is constructed in the same manner as the end members E and Eᵃ, in that it comprises a rectangular frame 19, vertical wires 20, and a horizontal wire 21. The back member, however, is provided with two straps 24 which serve as sliding hinges for the top member T. Each strap 24 is of steel shaped as shown in Fig. 7, the upper and lower ends being welded to the upper and lower horizontal sides of the rectangular frame 19, so that the strap stands well out from the plane of the member. The lower end of each strap is formed with a loop which drops below the lower side of frame 19. The frame 19 of the back member carries two spring clips 23 for coaction with the end members E and Eᵃ as hereinafter explained.

The front member F (see Fig. 9) is identical to the end members except as to length, and hence it need not be described in detail. The rectangular frame 19 of this member carries spring clips 23 for coaction with the frames 19 of the top and end members.

The end, back and front members are all pivotally attached to the bottom member by means of the hinges 18, 18$^a$ and 18$^b$ shown in Figs. 2 and 2$^a$, this attachment being accomplished by passing the lower sides of the frames 19 through these hinges. The hinges 18 for the end members E and E$^a$ are short, so that when the end members are folded inwardly they lie flat on the bottom member B. The hinges 18$^a$ for the front member F are longer so that this member when folded inwardly will lie flat on the end members. The hinges 18$^b$ for the back member B are still longer so that when folded inwardly this member will lie flat on the front member.

The general construction of the top member T (see Fig. 10) is similar to that of the end members in that it comprises a rectangular frame 19 of heavy wire. Connecting the two short sides of this frame are two heavy straight longitudinal wires 25 which lie on top of the frame and are welded thereto. Connecting the two shorter sides of the frame 19 are two heavy transverse wires 26 and 26$^a$. Each end of each wire 26 and 26$^a$ is welded to the upper side of the frame 19, and each end of each of these wires is bent as shown in Fig. 11 so that the wire passes under each of the heavy longitudinal wires 25. 27 are light longitudinal wires which are straight, and which are welded to the tops of the frame 19 and to the tops of the heavy transverse wire 26. Two light transverse wires 28 are bent as shown in Fig. 12 and are welded to the tops of the frame 19. The kinks 28$^a$ in these wires 28 enable them to pass under the heavy longitudinal wires 25, whereas the bends 28$^b$ enable them to pass over the light longitudinal wires 27. Other short light longitudinal wires 29 extend from the frame 19 to the adjacent heavy transverse wire 26 or 26$^a$, being welded to the top of the frame and of the heavy transverse wire, while they pass under the light transverse wires 28.

The top member T is provided with a sliding door D which closes the open space 30 shown in Fig. 10. As shown in Fig. 13, this door is rectangular in shape, comprising three spaced longitudinal wires 31, two transverse end wires 32, and a plurality of transverse spaced intermediate wires 33, all welded together wherever they meet. The two end wires 32 are formed as shown in Fig. 14, that is, they have an eye 32$^a$ at each end projecting beyond the body of the door, and these eyes surround wires 35 which are shaped and supported as shown in Fig. 15. That is, these wires are welded to the top of the right hand end of frame 19, and to the bottoms of the heavy transverse wires 26 and 26$^a$ so that the door is free to slide on the wires 35 to cover and uncover the open space 30. The middle transverse wire 31 of the door extends to the left beyond the door and is shaped as shown in Figs. 13 and 16 to form a spring clip coacting with the heavy transverse wire 26 to latch the door in closed position. One of the short longitudinal wires 29 of the top member is formed with a loop 29$^a$ where it joins the wire 26, so that the door can be sealed in closed position by a pad lock passing through this loop and around the left hand transverse wire 32 of the door.

Welded to the frame 19 of the top member T at the back of this member are two loops 36 (see Figs. 10 and 10$^a$) which coact with the straps 24 to enable the top member to slide and swing on these straps in the manner shown and explained in my United States Patent No. 1,362,645 granted on Dec. 21, 1920.

To latch the top member T to the end members E and E$^a$ when the crate is set up, the top member is provided at each end with a sliding wire 37 arranged to coact with the spring clips 22 on the adjacent end member. Several of the longitudinal wires 27 and 29 are provided with a dip near the frame 19 as shown at 27$^a$ in Fig. 17. Wires 37 slide in the guides which are thus provided by the clips 27$^a$ and by the longitudinal wires which are not dipped. When the top member is in place with its frame 19 in the spring clips 22 shown in Fig. 4, the wires 37 are shifted laterally under the lips 22$^a$ of these clips and are then held there by the hump 22$^b$ in each lip. The top member is thus latched to the end members, not only by the action of the clips 22 on the frame 19 of the top member, but also by the action of the lips 22$^a$ on the wires 37.

When the crate is set up, the top member T is attached to the front member by the spring clips 23, and also by a spring latch A. As illustrated in Figs. 18 and 19, this latch A comprises a U-shaped strap 38 of steel welded to the frame 19 of the top member T with the legs of the U projecting downwardly to straddle the frame 19 of the front member F. The inner leg of the strap 38 is provided with a slot 43 to receive a dog 40 which is pivoted on a pin 41 passing through the inner leg of the strap. This dog is bent as shown in Fig. 18, whereby when in the position shown in that view the front and top members are locked together. The dog 40 is biased to the locking position by a spring 42 attached to a pin 39, but may be swung out of this position against the action of the spring to release the two crate members.

The manipulation of the crate is as follows:

As shown in Fig. 1 the crate is in the "set-up" condition, ready to receive poultry. When it is desired to fold the crate, the top member is first released from the spring latch A and the spring clips 22 and 23, and is then swung upwardly to a vertical position, whereupon the straps 36 will slide downwardly on the straps 24. The end members E and E^a are then folded inwardly to lie flat on the bottom of the crate, the front member F is folded inwardly to lie flat on the end members, and the back and top members are then folded inwardly as a unit to lie flat on the front member. The spring latch A then latches the top member to the lower side of the frame 19 of the front member F. The procedure to set the crate up is the reverse of the foregoing and will be understood without detailed explanation.

It may be desirable to latch the top member T and the back member B together when the crate is in folded condition, and for this purpose the top member may be provided with a hook 44 as shown in Fig. 20, this hook being welded to some of the short longitudinal wires 29. As the top member slides vertically downward on the straps 24, the hook 44 passes under the upper side of frame 19 of the back member (see Fig. 6) and so holds the two members together.

One important feature of my invention is the construction of the top member T of the crate. It will be noted that the two heavy longitudinal wires 25, and the two heavy transverse wires 26, 26^a, are in a plane above all the remaining parts of the top member. When crates are piled one on top of another, these heavy wires take all the strain of shocks and sliding friction, and so serve to protect the lighter wires which are thus made possible for the remainder of the top structure.

A crate embodying my invention is cheap and simple to construct, easy to set up and knock down, and is remarkably rugged and serviceable.

Although I have herein shown and described only one form of crate embodying my invention, it is understood that various changes and modifications may be made therein within the scope of the appended claims without departing from the spirit and scope of my invention.

Having thus described my invention, what I claim is:

1. A poultry crate comprising an end member and a top member each having a wire frame, a U-shaped spring clip enveloping the frame of said end member and having its legs projecting vertically upward to receive the frame of the top member, the inner leg being bent horizontally to pass inside of the frame of the top member, and a wire slidably mounted in the top member to pass under the horizontal portion of said clip leg to latch the top member to the end member.

2. A poultry crate comprising an end member and a top member each having a wire frame, a U-shaped spring clip enveloping the frame of said end member and having its legs projecting vertically upward to receive the frame of the top member, the inner leg being bent horizontally to pass inside of the frame of the top member, said top member including a plurality of wires attached to said frame and extending inwardly perpendicular to the portion of the frame engaged by said clip, certain of said wires being bent downwardly near the frame to form with the remaining wires a guide parallel to the frame, and a wire slidably mounted in said guide to pass under the horizontal portion of said clip to latch the top member to the end member.

3. A poultry crate comprising a back member and a top member each having a rectangular steel frame, a vertical metal strap having its ends attached to the upper and lower horizontal sides respectively of said back frame, said strap lying well in the rear of the plane of said back member and having at its lower end a loop dropping below the lower side of the back frame, and a metal strap attached to the rear of said top frame and surrounding said first strap, whereby said top member may swing and slide with respect to said back member.

In testimony whereof I affix my signature.

BURNIE A. STAMP.